Sept. 28, 1965 L. H. AROND ETAL 3,208,902
NOVEL POLARIZING PRODUCTS AND PROCESSES
FOR THEIR PREPARATION
Filed May 5, 1961
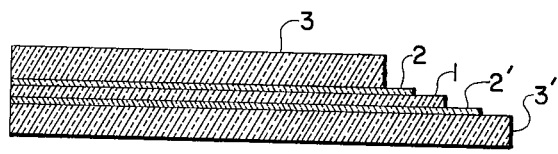
INVENTORS
Lester H. Arond
and
James L. Bailey
BY Brown and Mikulka
ATTORNEYS United States Patent Office 3,208,902
Patented Sept. 28, 1965

3,208,902
NOVEL POLARIZING PRODUCTS AND PROCESSES FOR THEIR PREPARATION
Lester H. Arond, Lexington, and James L. Bailey, West Newton, Mass., assignors to Polaroid Corporation, Cambridge, Mass., a corporation of Delaware
Filed May 5, 1961, Ser. No. 107,895
18 Claims. (Cl. 161—1)

This invention relates to new and improved optical laminations.

One object of this invention is to provide a new and improved light polarizer in laminated form comprising a sheet-like light-polarizing element having adhesively affixed thereto a plurality of sheets of glass or other protective media.

Another object is to provide a process for the production of new and improved laminated light polarizers wherein the polarizing sheet is bonded to a transparent, mechanically strong back, comprising, preferably, a glass material.

Another object is to provide a new and improved optical lamination comprising a birefringent element having adhesively affixed thereto a plurality of sheets of glass or other protective media.

Still another object is to provide a new and improved optical lamination comprising an optical light-filter element having affixed thereto a plurality of sheets of glass or other protective media.

Still another object is to provide new and improved circular and elliptical polarizers in laminated form comprising a light-polarizing lamination having adhesively affixed thereto a birefringent lamination.

Further objects of the present invention are: to provide an optical lamination wherein an optical element, for example a polarizing or birefringent element, is adhesively affixed between two sheets of a transparent element by means of an adhesive; to provide such a lamination wherein the index of refraction of the adhesive coincides substantially with that of the optical element; to provide such a lamination wherein the adhesive is a non-solvent for the plastic element; to provide such a lamination wherein the fabrication and/or subsequent optical modification of the lamination results in substantially no physical damage or destruction of the element; and to provide such a lamination with an adhesive bond that is not deleteriously affected by dry heat, humidity, water immersion or exposure to a high intensity light source, whereby the shelf-life of such elements is substantially extended over the shelf-life of prior art laminations.

Other objects of the invention will in part be obvious and will in part appear hereinafter.

This invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing, which represents a cross-section of the basic embodiment of this invention.

Laminated optical elements are subjected to conditions in fabrication, storage and use, which often result in physical and optical defects necessitating rejection of the elements. These defects may occur, for example, as a result of grinding, polishing, mounting, etc., during fabrication, whereby separation, fragmentation and sheet split occur. Defects may also arise during storage or use as a result of humidity, dry heat, etc., whereby the components of the element lose their adhesion and separate. Optical defects may arise as a result of adhesive degradation or other chemical changes occurring in the adhesive layer.

Consequently, there has been a need for laminations with an adhesive bond that will successfully withstand the various conditions of fabrication, storage and use to which such elements are subjected, without substantial physical or optical degradation. The selection of an adhesive for such laminations has been complicated by an additional difficulty since the optical element to be bonded to the protective media is generally a polymeric film such as polyvinyl alcohol, and therefore difficult to bond. By means of this invention, optical laminations superior to prior art laminations, i.e., optical laminations that fulfill the above-described need, have been prepared using a cross-linked epoxy compound as the adhesive. The outstanding adhesive qualities found in the laminations of this invention are unexpected and surprising in view of the known qualities of polyvinyl alcohol as a release and parting agent when used together with epoxy residue in laminating applications.

The present invention contemplates the production of a laminated optical element having attributes superior to any previously known optical laminations, particularly with regard to adhesive and shelf-life stability, and comprising essentially a central layer of optical material, e.g., light-polarizing material in sheet-like form, two outer layers of glass or other like protective material, and intermediate layers of adhesive adapted to join permanently the optical layer to the outer layers of glass or other material. The rejection level of the laminated optical elements of this invention is substantially less than the rejection level of prior art laminations.

As examples of optical elements useful in this invention, mention may be made of light-polarizing elements, birefringent elements and light filters.

As an example of a polarizing material useful in this invention, mention may be made of oriented polyvinylene in molecularly oriented polyvinyl alcohol. Such polarizers are described generally in U.S. Patents Nos. 2,173,304, issued Sept. 19, 1939, and 2,255,940, issued Sept. 16, 1941.

Another example of polarizing material useful in this invention is oriented polyvinyl alcohol which has been dyed or stained with a solution comprising iodine to form in the sheet an oriented dichroic complex of iodine in solid polyvinyl alcohol. Such polarizers are described generally in U.S. Patent No. 2,237,567, issued Apr. 8, 1941.

As an example of a birefringent element useful in this invention, mention may be made of the birefringent element as generally shown in U.S. Patent No. 2,441,049, issued May 4, 1948. Birefringent laminations may in turn be further laminated to polarizing elements to produce circular or elliptical light polarizers.

This invention also contemplates the use of unsupported and supported or strengthened optical elements. A description of such supported elements may be found, for example, in U.S. Patents Nos. 2,554,850, issued May 29, 1951, and 2,674,159, issued Apr. 6, 1954.

The term "light filter" comprehends a sheet or film, such as gelatin or polyvinyl alcohol dyed with a dichroic dye that is soluble in the matrix.

The adhesive employed to bond the protective media to the optical sheet preferably comprises an epoxy-type resin and a hardening or curing agent, preferably a polyamide hardening or curing agent.

As previously mentioned, the preferred transparent protective media employed in the practice of this invention are glass sheets, although other media, for example synthetic plastics such as a polymerized methacrylic acid ester, sheet cellulosic compounds, or other similar media, may be employed where the qualities of glass are not required. As examples of other transparent elements that have been found satisfactory for use in this invention as protective media mention may be made of sheets of cellulose acetate butyrate, allyl diglycol carbonate, polyvinyl chloride and chlorinated polyvinyl chloride. In a preferred embodiment of the invention, the protective media, for example, the glass sheets, prior to the bonding operation are cleaned by heating to 300° F. in glycerine, cooling, washing with water, and drying. The thickness of the glass or other material employed as the protective cover plates is only limited to the extent that it necessarily must have sufficient strength to resist breakage under pressures employed in fabricating the lamination.

In the process of uniting the optical sheet to the protective media by means of the epoxy-type adhesive, the hardener and resin are deaerated, and mixed under vacuum to minimize the possibility of entrapped air, applied to the lamination, and cured under suitable conditions.

In a preferred embodiment, the resin and hardener, preferably a mixture of 70 parts epoxy resin and 30 parts of hardening or curing agent, is deaerated, mixed, and applied, at room temperature, in a relatively thin layer to a glass protective layer, and a sheet-like optical material is then applied to the adhesive on the glass stratum. A relatively thin layer of adhesive is then applied to the free side of the optical sheet and a second glass protective sheet is applied to the adhesive on the optical stratum. The laminated assembly is then placed in a suitable press or holding device, subjected to a uniform low pressure and cured at an elevated temperature. The lamination is then removed from the press and cleaned. The lamination may then be optically modified for subsequent use or, where desirable, utilized directly.

Although the adhesive is preferably applied at room temperature, the adhesive application may take place at elevated temperatures if desired, for example, when using a high viscosity resin or hardener as the adhesive mixture.

Epoxy resins suitable for use in this invention contain two or more epoxy groups per molecule. These epoxy resins generally are the product formed by the condensation of epichlorhydrin and bisphenol A. In a preferred embodiment, the resin has an epoxide equivalent of 175 to 210; however, resins having an epoxide equivalent in the range of 140 to 500 may be used. A typical molecule of the epoxy resin used in this invention is as follows:

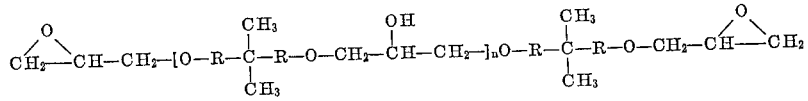

where $n$ is an integer greater than 2 and R is

In a preferred embodiment, the epoxy resin has viscosity of 500 to 700 cps.; however, the viscosity of the resin may be varied over a wide range without adversely affecting the adhesive bond of the lamination. The desired viscosity of the epoxy resin selected by the operator is dependent upon the ease of handling the resin for the particular mode of adhesive application chosen. The viscosity of the epoxy resin may be controlled physically, as by heating or, preferably, by the use of a reactive diluent. As examples of reactive diluents suitable for use in this invention, mention may be made of phenyl glycidyl ether and allyl glycidyl ether.

The hardening or curing agent selected may be any one suitable for cross-linking epoxy resins. In a preferred embodiment, polyamide hardening agents are used. Such compounds are condensation products of polyamines and dibasic acids produced by the polymerization of unsaturated fatty acids. Polyamide curing agents of this type that are satisfactory for this invention are commercially available from General Mills, Inc., Kankakee, Illinois under the trade name Versamid. Versamid polyamide resins found useful in this invention include Versamid 115, having an amine value of 215 and a specific gravity at 25° C./25° C. of 0.99; Versamid 125, having an amine value of 305 and a specific gravity at 25° C./25° C. of 0.97; and Versamid 140, having an amine value of 375 and a specific gravity at 25° C./25° C. of 0.97.

In addition to the polyamide-type curing agents, other curing agents known to the art may be used, such as acid anhydrides, e.g., succinic anhydride, organic acids, and primary and secondary amines.

The epoxy-hardener mixture used in this invention has a room temperature pot life, or period during which it flows sufficiently to be applied to the lamination, of several hours, permitting great flexibility in the preparation of these laminations.

While a process of the present invention has been described above, it is to be understood that the process may be modified without departing from the invention. For example, the epoxy resins may possess a wide viscosity range. The ratio of epoxy resin to curing agent may be varied over a wide range without adversely affecting the adhesion of the element. Application of the resin may be accomplished by any means known to the art, for example, by painting, spreading, extrusion through a nozzle under pressure, etc. The curing conditions may also be modified at the election of the operator, depending upon the selection of the particular resin-hardener combination, limited only by the stability of the protective media or the optical element to such conditions.

The laminations described above are exemplified by the drawing, which shows a cross-section of the basic embodiment of this invention. As shown in the drawing, the lamination comprises a polyvinyl alcohol sheet-like element 1, solid transparent protective sheets 3 and 3', and bonding layers 2 and 2' which comprise a cross-linked epoxy polymer.

The following non-limiting examples illustrate the preparation of the novel optical laminations of this invention.

EXAMPLE I 7 grams of an epoxy resin with an epoxide equivalent of 175 to 195 was mixed with 3 grams of a polyamide curing agent (solid by General Mills, Inc., Kankakee, Illinois, under the trade name Versamid 140). The adhesive mixture was deaerated by applying a 0.1 mm. vacuum for one hour. A small amount of adhesive was then applied to a glass protective stratum, prepared as described above. A sheet-like polarizing element of oriented polyvinylene in oriented polyvinyl alcohol was then applied to the adhesive on the glass. A small amount of resin was then applied to the free surface of the polarizing sheet and a second glass protective layer was applied to the adhesive on the polarizing stratum. After the lamination was placed in a jig, the adhesive was cured for 2 hours at 95° C. The lamination was then edged and polished on standard glass processing equipment. Optical laminations prepared in this manner, when subjected to the following test conditions, showed no edge separation, splitting or other optical or physical deterioration:

(1) Exposure to 95% relative humidity, 30° C. for 240 hours.

(2) Dry heat (65° C.) for 240 hours.

(3) Accelerated weather testing cycle, i.e., 18 hours' exposure at 48° C. to a G.E. sunlamp, 2 hours at 100% relative humidity at 22° C., 2 hours exposure to sunlight, and 2 hours exposure to 100% humidity.

(4) 240 hours exposure to a xenon arc at 112° F. and 50% relative humidity.

EXAMPLE II

One optical lamination using as a polarizing element an oriented polyvinyl alcohol-iodine complex was prepared as in Example I. Laminations prepared in this manner showed no optical or physical degradation after exposure to dry heat at 65° C. for 300 hours or water immersion at 25° C. for 150 hours.

EXAMPLE III

A light filter was prepared by imbibing a sheet of oriented polyvinyl alcohol with a 1% solution of Du Pont Pontamine Fast Yellow L2RX (Direct Yellow 23) until the desired optical density was obtained (70% transmission). Using this filter, an optical lamination was prepared as in Example I. Laminations prepared in this manner showed no optical or physical degradation after exposure to dry heat at 65° C. for 240 hours, water immersion at 25° C. for 240 hours, or exposure to xenon arc at 112° F. and 50% relative humidity for 240 hours.

EXAMPLE IV 10 grams of an epoxy resin having an epoxide equivalent of 175 to 195 was mixed with 4 grams of succinic anhydride. A reaction initiator, N,N-dimethylbenzylamine (0.5 g.) was also added. The mixture was deaerated by application of a 0.1 mm. vacuum for one hour. Using this adhesive, a lamination comprising glass protective strata and a polarizing element of oriented polyvinylene in oriented polyvinyl alcohol was prepared and cured for 48 hours at 95° C. Laminations prepared in this manner were subjected to water immersion for 240 hours at 25° C. and dry heat for 240 hours at 65° C. without optical or physical degradation.

EXAMPLE V 4.5 grams of epoxy resin having an epoxide equivalent of 180 to 195 were mixed with 5.5 grams of a polyamide curing agent (sold by General Mills, Inc., Kankakee, Illinois, under the trade name Versamid 140). The adhesive was processed and optical laminations were then prepared as in Example I. The laminations prepared in this manner were subjected to dry heat at 65° C. for 240 hours and water immersion at 250° C. for 240 hours without optical or physical degradation.

EXAMPLE VI 6 grams of epoxy resin with an epoxy equivalent of 175 to 195 were mixed with 4 grams of a polyamide curing agent (sold by General Mills, Inc., Kankakee, Illinois, under the trade name Versamid 115). The adhesive was processed and laminations prepared as in Example I. The laminations prepared in this manner were subjected to dry heat for 250 hours and water immersion at 25° C. for 250 hours without physical or optical degradation.

EXAMPLE VII

Light-polarizing laminations were prepared as in Example I using 4.5 grams of epoxy resin and 5.5 grams of polyamide curing agent. Laminations prepared in this manner were subjected to water immersion at 25° C. for 250 hours without optical or physical degradation.

The laminations of this invention possess improved physical and optical properties. The adhesive material described above maintains a strong and complete bond between the optical material and the protective media over a wide range of temperature, humidity, water immersion and weathering conditions, thereby extending the shelf-life and use-lift of the optical elements to a substantial degree. Various dyes and ultraviolet absorbers may be added to the adhesive without detrimental effects on the quality of the bond.

As stated above, the adhesive material does not deleteriously affect the optical qualities of the lamination. For example, no cast birefringence is observed in the light-polarizing laminations of this invention.

It has been found with this invention that a relatively thin adhesive layer may be used, thereby minimizing the possibility of lens deformation, interference layers resulting from air gaps, or other optical aberrations. Adhesive layers ranging from 0.0002 to 0.001 inch have been found satisfactory. This finding is unexpected in view of prior art laminations where considerably thicker layers were necessary.

The epoxy resin adhesive layers exhibit an index of refraction approximately equal to that of a molecularly oriented sheet of polyvinyl alcohol.

It should be understood that multiple laminations may, in turn, be bonded to each other within this invention. For example, a birefringent element lamination may be bonded to a light-polarizing lamination to produce a circular polarizer.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A lamination comprising a plurality of transparent elements, having sandwiched therebetween and bonded thereto a sheet-like optical element comprising polyvinyl alcohol, said transparent elements and said polyvinyl alcohol optical element being bonded by a cross-linked epoxy polymer.

2. A lamination as defined in claim 1 wherein said transparent elements are glass.

3. A lamination as defined in claim 1 wherein said optical element is a light-polarizing element.

4. A lamination as defined in claim 1 wherein said optical element is a birefringent element.

5. A lamination as defined in claim 1 wherein said optical element is a light filter.

6. A lamination as defined in claim 1 wherein said cross-linked epoxy polymer is the addition product of an epoxy resin containing at least two epoxy groups per molecule and a curing agent selected from the group consisting of polyamides, acid anhydrides, organic acids and primary and secondary amines.

7. A process for forming an optical lamination having at least one inner layer comprising polyvinyl alcohol and outer layers comprising transparent solid sheet-like elements, which comprises bonding at least one optical sheet-like layer comprising polyvinyl alcohol to a plurality of transparent solid sheet-like layers employing as a bonding agent a cross-linked epoxy polymer.

8. A process as defined in claim 7 wherein said transparent solid sheet-like elements are glass.

9. A process as defined in claim 7 wherein said optical sheet-like layer comprising polyvinyl alcohol is a light-polarizing element.

10. A process as defined in claim 7 wherein said optical sheet-like layer comprising polyvinyl alcohol is a birefringent element.

11. A process as defined in claim 7 wherein said optical sheet-like layer comprising polyvinyl alcohol is a light filter.

12. A process for forming an optical lamination having at least one inner layer comprising polyvinyl alcohol and outer layers comprising transparent solid sheet-like elements, which comprises bonding at least one optical sheet-like layer comprising polyvinyl alcohol to a plurality of transparent solid sheet-like layers employing as a bonding agent an adhesive composition comprising an epoxy resin mixed with and cross-linked by a curing agent selected from the group consisting of polyamides, acid anhydrides, organic acids, and primary and secondary amines.

13. A process as defined in claim 12 wherein said epoxy resin is the product of the condensation of epichlorhydrin and bisphenol A.

14. A process as defined in claim 12 wherein said adhesive mixture is applied at room temperature.

15. A process as defined in claim 12 wherein curing is carried out at 95° C.

16. A lamination comprising a plurality of transparent elements having sandwiched therebetween and bonded thereto a sheet-like optical element comprising polyvinyl alcohol, said transparent elements and said polyvinyl alcohol optical element being bonded by a cross-linked epoxy polymer, said bond comprising a layer ranging from 0.0002 to 0.001 inch in thickness.

17. A light polarizer comprising a plurality of transparent glass sheets having sandwiched therebetween and bonded thereto a sheet-like light-polarizing element comprising oriented polyvinylene in molecularly oriented polyvinyl alcohol, said transparent glass sheets and said light-polarizing element being bonded by a cross-linked epoxy polymer.

18. A light polarizer as defined in claim 17 wherein said cross-linked epoxy polymer bond comprises a layer ranging from 0.0002 to 0.001 inch in thickness.

References Cited by the Examiner

UNITED STATES PATENTS

| | | | |
|---|---|---|---|
| 2,168,220 | 8/39 | Land | 88—65 |
| 2,270,323 | 1/42 | Land et al. | 156—102 |
| 2,420,270 | 5/47 | Thomas | 156—100 |
| 2,553,961 | 5/51 | Dreyer | 156—100 X |
| 2,705,223 | 3/55 | Renfrew et al. | 154—2.75 X |
| 2,785,085 | 3/57 | Sayre. | |
| 2,872,427 | 2/59 | Schroeder. | |
| 2,909,204 | 10/59 | Somerville | 161—185 |
| 2,976,256 | 3/61 | Whittier et al. | |

ALEXANDER WYMAN, Primary Examiner.

EARL M. BERGERT, CARL F. KRAFFT, Examiners.